US009366547B2

(12) United States Patent
Forsyth et al.

(10) Patent No.: US 9,366,547 B2
(45) Date of Patent: Jun. 14, 2016

(54) SENSOR ARRANGEMENT AND METHOD FOR OPERATING A SENSOR ARRANGEMENT

(75) Inventors: Richard Forsyth, Graz (AT); Gerhard Oberhoffner, Graz (AT); Kurt Riedmüller, Unterpremstätten (AT); Davide Maschera, Lieboch (AT)

(73) Assignee: ams AG, Unterpremstatten (AT)

( * ) Notice: Subject to any disclaimer, the term of this patent is extended or adjusted under 35 U.S.C. 154(b) by 1638 days.

(21) Appl. No.: 12/632,593

(22) Filed: Dec. 7, 2009

(65) Prior Publication Data
US 2011/0133723 A1 Jun. 9, 2011

(51) Int. Cl.
*G01B 7/14* (2006.01)
*G01D 5/14* (2006.01)

(52) U.S. Cl.
CPC ...................... *G01D 5/145* (2013.01)

(58) Field of Classification Search
CPC ... G01D 5/2275; G01D 5/2283; G01D 5/204; G01D 5/2046; G01D 5/2053; G01D 5/206; G01D 5/22; G01D 5/2208; G01D 5/2216; G01D 5/2225; G01D 5/2233; G01D 5/2241; G01D 5/225; G01D 5/2258; G01D 5/2266; G01D 5/14; G01D 5/142; G01D 5/145; G01D 5/147; G01D 5/16; G01D 5/20; G01D 5/2006; G01D 5/2013; G01D 5/202; G01D 5/2026; G01D 5/2033; G01B 7/02; G01B 7/023; G01B 7/04; G01B 7/046; G01B 7/14; G01B 7/30; H01L 43/00; H01L 43/06; H01L 43/08; G01R 33/0094; G01R 15/20; G01R 15/202; G01R 15/205; G01R 33/07; G01R 33/072; G01R 33/075; G01R 33/077
USPC .............. 324/207.2, 207.24, 207.26
See application file for complete search history.

(56) References Cited

U.S. PATENT DOCUMENTS

2004/0130317 A1* 7/2004 Hatanaka ................. 324/207.2
(Continued)

FOREIGN PATENT DOCUMENTS

DE 10 2004 010 362 9/2005

OTHER PUBLICATIONS

"AS5011—Low Power Integrated Hall IC for Human Interface Applications", Data Sheet, revision 3.10, pp. 1-16, austriamicrosystems AG, Austria.
(Continued)

*Primary Examiner* — Jay Patidar
*Assistant Examiner* — David M. Schindler
(74) *Attorney, Agent, or Firm* — McDermott Will & Emery LLP

(57) ABSTRACT

A sensor arrangement has a plurality of Hall sensor devices, each configured to provide a sensor voltage in response to a magnetic field intensity. A selection unit is configured to forward either of the sensor voltages in response to a selection signal. A transconductance amplifier is configured to generate a sensing current depending on a forwarded sensor voltage. A filter stage has a resistor and a filter capacitor connected in parallel in a switchable manner in response to a first switching signal. The filter stage is configured to generate a filtered voltage across the filter capacitor depending on a sensing current. A capacitive analog-to-digital converter has an input capacitor being connected to the filter capacitor in a switchable manner in response to a second switching signal. The analog-to-digital converter is configured to generate a digital sensor value based on a filtered voltage. The sensor arrangement further has a control circuit which is configured to generate the selection signal and the first and the second switching signals such that for each of the forwarded sensor voltages in a first time segment, the filtered voltage across the filter capacitor is generated, and in a second time segment, the input capacitor is connected to the filter capacitor.

26 Claims, 4 Drawing Sheets

(56) References Cited

U.S. PATENT DOCUMENTS

| | | | |
|---|---|---|---|
| 2005/0088170 A1* | 4/2005 | Steele et al. | 324/207.2 |
| 2007/0114988 A1 | 5/2007 | Rossmann et al. | |
| 2009/0051351 A1* | 2/2009 | Forsyth | 324/207.2 |
| 2009/0160433 A1 | 6/2009 | Oberhoffner | |

OTHER PUBLICATIONS

"Austriamicrosystems announces its new EasyPoint™ joystick module based on contactless sensing technology," Austriamicrosystems Press Release, Jul. 9, 2009, 2 pages.

* cited by examiner

42

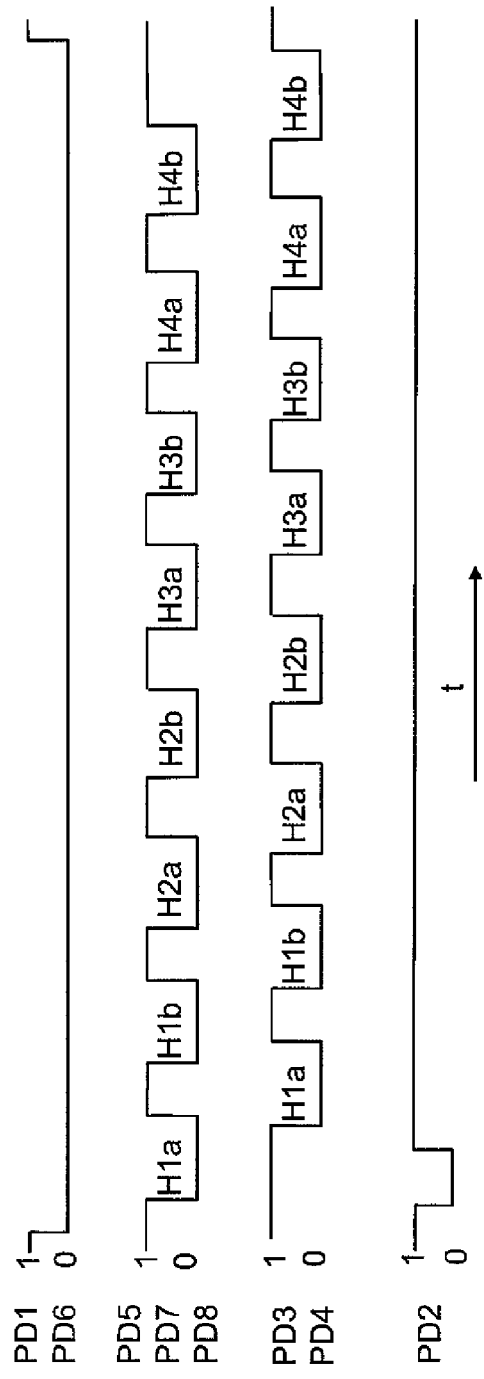
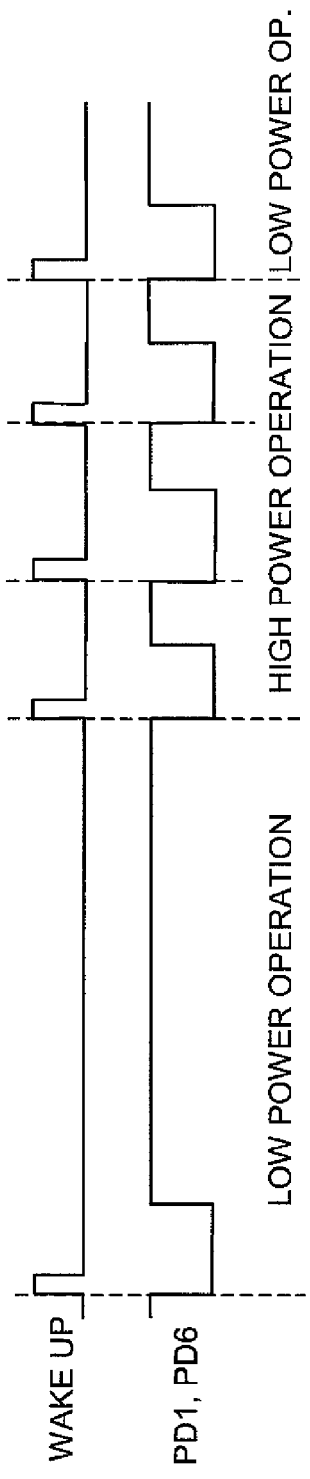
FIG 5
FIG 6

SENSOR ARRANGEMENT AND METHOD FOR OPERATING A SENSOR ARRANGEMENT

FIELD OF THE INVENTION

The invention relates to a sensor arrangement and to a method for operating a sensor arrangement.

BACKGROUND OF THE INVENTION

In many applications, Hall sensors are employed to detect a position or an angle of a magnetic source placed over the Hall sensors. For example, there are increased requirements for navigations keys or pointing devices in the area of smart handheld devices and cell phones. In former solutions, four switches for different directions were used for such purposes. However, such a solution is not sufficient anymore to provide good navigation and selection means for upcoming applications. Therefore, Hall sensor signals are evaluated to determine a movement or a rotation with a certain resolution.

It is desirable to have sufficient resolution even for small movement ranges of the navigation knob. Furthermore, robustness against dust, humidity and light is desirable, wherein such robustness should be maintained during the lifetime of the respective circuit. The described features can be provided by a contactless magnetic solution employing Hall sensors.

However, smart sensors using Hall sensors need special treatment to compensate for or to correct possible imperfections of the Hall sensors used. These are mainly the offset voltage, a sensitivity drift and a low signal level. To compensate for these effects, a feedback loop can be used which reduces a major part of the offset. Further parts of the offset can be reduced by noise shaping and filtering. Such a solution can provide results with a sufficient resolution and accuracy. However, as all of the described measures have to be employed continuously, such a circuit has higher power requirements.

As in the area of smart handheld devices and cell phones power efficiency cannot be neglected, it is desirable to have Hall sensor arrangements which are able to provide sensing signals with good resolution, efficient accuracy and improved power efficiency.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Rather, its primary purpose is merely to present one or more concepts of the invention in a simplified form as a prelude to the more detailed description that is presented later.

To overcome the problems in the prior art, several embodiments of a sensor arrangement having Hall sensor devices and several embodiments of a method for operating a sensor arrangement having Hall sensor devices are proposed.

One embodiment of a sensor arrangement comprises a plurality of Hall sensor devices which are each configured to provide a sensor voltage in response to a magnetic field intensity. For example, the magnetic field is generated by a magnetic source arranged over the Hall sensor devices. The sensor arrangement further comprises a selection unit which is configured to forward either of the sensor voltages in response to a selection signal. A transconductance amplifier is configured to generate a sensing current depending on the forwarded sensor voltage. A filter stage of the sensor arrangement has a resistor and a filter capacitor which can be connected in parallel in a switchable manner in response to a first switching signal. A filter stage is configured to generate a filtered voltage across the filter capacitor depending on the sensing current. For example, the filtered voltage is generated by charging the filter capacitor with the sensing current. The sensor arrangement further includes a capacitive analog-to-digital converter which has an input capacitor being connected to the filter capacitor in a switchable manner in response to a second switching signal. The analog-to-digital converter is configured to generate a digital sensor value based on the filtered voltage. A control circuit of the sensor arrangement is configured to generate the selection signal and a first and a second switching signal such that for each of the forwarded sensor voltages in a first time segment, the filtered voltage across the filter capacitor is generated, and in a second time segment, the input capacitor is connected to the filter capacitor. Preferably, the first and the second time segment are non-overlapping.

As the transconductance amplifier, the filter stage and the analog-to-digital converter are used for all of the plurality of Hall sensor devices, their respective sensor voltages can be processed sequentially. Hence, it is possible to use a single driving circuit for all of the Hall sensor devices which results in an intrinsic matching of the respective sensor voltages.

The switchable connection of the resistor and the filter capacitor in the filter stage makes it possible to use the filter capacitor as well for filtering purposes as for the purpose of transferring charge directly to the input capacitor of the analog-to-digital converter without the need to employ any buffering amplifiers. Hence, power consumption is reduced compared to conventional arrangements where an input signal to the analog-to-digital converter has to be buffered actively.

Due to the switching of the filter capacitor, the filter capacitor acts as a sample and hold stage for the input capacitor of the analog-to-digital converter. Various types of analog-to-digital converters can be used in the sensor arrangement, sharing the principle that the voltage across the input capacitor, previously transferred from the filter capacitor, is converted into a digital value. For example, this can be done by comparing said voltage to respective sampling voltages which, for example, are based on predefined reference voltages. To this end, a successive approximation principle can be employed. Preferably, the analog-to-digital converter is a Nyquist type converter, or in other words, does not use an oversampling method. This makes it possible to generate the respective digital value for the voltage across the input capacitor within a short time and to switch off the analog-to-digital converter during at least most of the time of the first time segment when the filtered voltage is generated. Switching of the analog-to-digital converter can be controlled by the control circuit by means of a first power-down signal.

In one embodiment, the sensor arrangement further comprises an offset current circuit which generates an offset current which is provided additive to the sensing current to the filter stage such that the filtered voltage also depends on the offset current. This has the effect that an offset generated by the Hall sensor device can be compensated. The offset current circuit can be switched off temporarily in response to a further power-down signal during a time segment in which no filtering is performed. This can further reduce the power usage of the sensor arrangement.

In one embodiment, also the transconductance amplifier is configured to be switched off temporarily in response to a further power-down signal for improving efficiency. The power-down signal for the transconductance amplifier can be the same as for the offset current circuit.

In one embodiment, the sensor arrangement further comprise a Hall bias current circuit which is configured to provide a Hall bias current to either of the Hall sensor devices in response to the selection signal and a mid-point control circuit which is configured to provide a mid-point control signal to either of the Hall sensor devices in response to the selection signal. As the same circuits are used to generate the Hall bias current and the mid-point control signal to all of the Hall sensor devices, an intrinsic matching of the corresponding sensor voltages can be achieved. Also the Hall bias current circuit and the mid-point control circuit can be switched off temporarily in response to a further power-down signal.

In one embodiment, the sensor arrangement further comprises a first oscillator circuit which is configured to generate a first clock signal which is provided to the control circuit as a basis for the generation of the selection signal and the respective switching signals and the second oscillator circuit which is configured to generate a second clock signal having a higher clock frequency than the first clock signal. The second clock signal is provided to the analog-to-digital converter. The first and second oscillator circuit are dimensioned such that the second oscillator circuit has a higher power consumption than the first oscillator circuit. Furthermore, the second oscillator circuit is configured to be switched off temporarily in response to a further power-down signal.

In one embodiment, the sensor arrangement is configured to determine, during one measurement cycle, a set of digital sensor values comprising at least one respective digital sensor value for each of the Hall sensor devices. For example, if the Hall sensor devices are operated in a chopping mode of operation, a set of digital sensor values comprises two digital sensor values for each of the Hall sensor devices. In this embodiment, the control circuit is configured to control the sensor arrangement in a low-power mode of operation such that a time interval between consecutive measurement cycles is larger than a time for one measurement cycle, for example, by at least one order of magnitude. In other words, the sensor arrangement has an on-cycle during which sensor values of the Hall sensor devices are retrieved, and an off-cycle during which no measurement is performed. Hence, during the off-cycle, the sensor arrangement can be controlled to a low-power mode of operation during which unnecessary circuit parts are switched off.

Accordingly, in a further embodiment, the control circuit is configured to control the sensor arrangement in a high-power mode of operation such that a time interval between consecutive measurement cycles is reduced compared to the low-power mode of operation depending on an evaluation of at least one set of digital sensor values determined. For example, if the set of digital sensor values indicates that the magnetic field is altered such that certain threshold values are exceeded, it may be necessary to evaluate the magnetic field more often than for a standard magnetic field intensity which may indicate a zero condition or starting condition.

In another embodiment, the control circuit is configured to control the sensor arrangement such that the sensor arrangement is switched to the high-power mode of operation, if evaluation of a single digital sensor value reveals that a predetermined threshold is exceeded by said digital sensor value. During the low power mode of operation, the digital sensor value is only determined for a single Hall sensor device, accordingly. Hence, as only one measurement is performed during one measurement cycle, power consumption can be further reduced by a factor depending on the number of Hall sensor devices. Alternatively, more than one measurement can be performed during one measurement cycle.

Furthermore, an exemplary embodiment of a method for operating a sensor arrangement having a plurality of Hall sensor devices being responsive to a magnetic field intensity is described. The method comprises controlling, in a sequential manner, each of the plurality of Hall sensor devices to generate a sensor voltage. The respective generated sensor voltages are forwarded to a transconductance amplifier in a sequential manner. A sensing current is generated depending on the forwarded sensor voltage by means of the transconductance amplifier. During a first time segment for each of the forwarded sensor voltages, a resistor and a filter capacitor are connected in parallel. During said first time segment, the filter capacitor is charged with the respective generated sensing current. Thus, a filtered voltage across the filter capacitor is generated. At the end of the first time segment, the resistor and the filter capacitor are disconnected. During a second time segment for each of the forwarded sensor voltages, the filter capacitor is connected to an input capacitor of a capacitive analog-to-digital converter. During said second time segment, a digital sensor value is generated based on said filtered voltage by means of the analog-to-digital converter. Preferably, each second time segment starts after a corresponding first time segment for each of the forwarded sensor voltages.

The various embodiments described before for the sensor arrangement can also be transferred to the operating method. In particular, several parts of the sensor arrangement can be switched off by the operating method which makes it possible to achieve a good power efficiency for the sensor arrangement. Additionally, an accuracy of the sensor arrangement can be held high.

To the accomplishment of the foregoing and related ends, the following description and annexed drawings set forth in detail certain illustrative aspects and implementations of the invention. These are indicative of but a few of the various ways in which one or more aspects of the present invention may be employed. Other aspects, advantages and novel features of the invention will become apparent from the following detailed description when considered in conjunction with the annexed drawings.

BRIEF DESCRIPTION OF THE DRAWINGS

The invention is explained in detail below on the basis of exemplary embodiments with reference to the drawings. In the drawings, FIG. 5 shows a time diagram of several power-down signals used in the sensor arrangement, and FIG. 6 shows a timing diagram for different modes of operation.

DETAILED DESCRIPTION OF THE DRAWINGS

Figure 1:
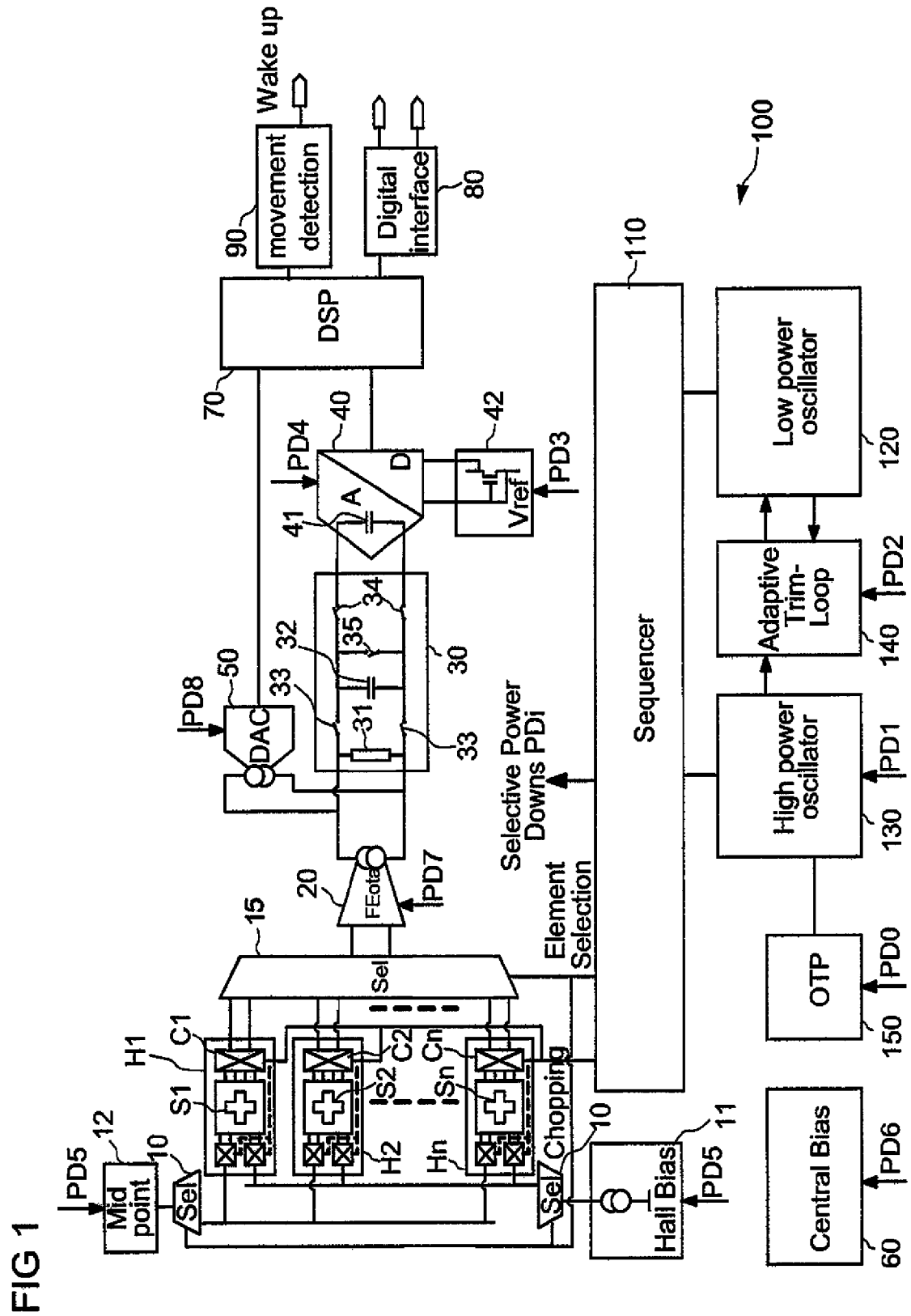
FIG. 1 shows an exemplary embodiment of a sensor arrangement having Hall sensor devices.

FIG. 1 shows an exemplary embodiment of a sensor arrangement. The sensor arrangement comprises a plurality of Hall sensor devices H1, H2, Hn which each include a Hall sensor S1, S2, Sn and a chopping circuit C1, C2, Cn. Furthermore, a Hall bias current circuit 11 and a mid-point control circuit 12 are included having outputs that are connected to the Hall sensor devices H1, H2, Hn by means of selection elements 10. Outputs of the Hail sensor devices H1, H2, Hn for providing a respective Hall sensor voltage are connected to a selection unit 15 which has a single output connected to a transconductance amplifier 20 which preferably is an operational transconductance amplifier. A current output of the transconductance amplifier 20 is connected to a filter stage 30 comprising a resistor 31, a filter capacitor 32 and switching elements 33, 34 and 35. In particular, the resistor 31 and the filter capacitor 32 can be connected in parallel by means of the switching device 33. The filter capacitor 32 can be short-circuited by means of the switching device 35 and can be connected to an input capacitor 41 of a capacitive analog-to-digital converter 40 by means of the switching device 34. The analog-to-digital converter 40 comprises a reference voltage circuit 42 for providing one or more reference voltages serving as a basis for comparisons performed within the analog-to-digital converter 40. An output of the analog-to-digital converter 40 is connected to a processing unit 70 which includes a digital signal processor in this embodiment.

The sensor arrangement further comprises an offset current circuit 50 comprising a current digital-to-analog converter controlled by the processing unit 70 by means of an offset control signal. An output current source of the offset current circuit 50 is connected in parallel to an output current source of the transconductance amplifier 20.

A further output of the processing unit 70 is connected to a movement detection unit 90. Furthermore, an output of the processing unit 70 is connected to a digital interface 80 serving as a data output of the sensor arrangement.

The sensor arrangement further comprises a control circuit 100. The control circuit 100 includes a sequencer 110 which provides a selection signal for element selection to the selection elements 10 and the selection unit 15. Furthermore, the sequencer 110 provides respective switching signals for the switching elements 33, 34 and 35 which are not shown for reasons of a better overview. The sequencer 110 additionally generates selective power-down signals PDi, with i=1-8 in this embodiment.

The control circuit 100 further comprises a low-power oscillator 120, a high-power oscillator 130, an adaptive trim loop 140, a non-volatile memory 150 which, for example, is a one-time programmable, OTP, circuit. The sensor arrangement further includes a central bias current circuit 60 for providing a defined bias current to several circuits of the sensor arrangement, wherein respective connections to the elements are not shown for reasons of a better overview. Circuits receiving the defined bias current are, for example, circuits 11, 12, 20, 40, 42, 50, 70, 80, 90, 110, 120, 130, 140 and 150 shown in FIG. 1.

During operation of the sensor arrangement, a signal of each of the Hall sensor devices H1, H2, Hn is evaluated in a sequential manner, controlled by the control circuit 100 and the sequencer 110, respectively. To this end, the Hall bias current generated by the Hall bias current circuit 11 and the mid-point control signal generated by the mid-point control circuit 12 are provided to either of the Hall sensor devices H1, H2, Hn depending on the selection signal provided by the sequencer 110. Hence, the Hall sensor device which is supplied with the mid-point control signal and the Hall bias current generates a Hall sensor voltage in response to a magnetic field intensity acting on the Hall sensor of the device.

The sensor voltage is provided to the transconductance amplifier 20 by means of the selection unit 15 which, for example, acts as a multiplexer. The sensor voltage is converted to a sensing current by the transconductance amplifier 20, and the sensing current is provided to the filter stage 30. Thus, a filtered voltage is generated across the filter capacitor 32. The filtered voltage is further provided to the analog-to-digital converter 40 and in particular to the input capacitor 41. A more detailed explanation of the filtering and forwarding process will be given below with reference to FIG. 2.

The analog-to-digital converter 40 preferably is a Nyquist type analog-to-digital converter which performs the analog-to-digital conversion based on the Nyquist frequency, or in other words, without employing oversampling. For example, a successive approximation principle is used wherein respective comparison voltages are generated based on reference voltages provided by the reference voltage circuit 42. The corresponding digital value is provided to the processing unit 70. When the digital value is determined, the sequencer 110 can start the next measurement, wherein said next measurement can either be with the same Hall sensor device with current spinning or chopping employed or with the next Hall sensor device. Hence, a measurement is performed for each of the Hall sensor devices in a sequential manner. The chopping operation is controlled by means of a chopping control signal which is generated by the control circuit 100 or the sequencer 110, respectively. In particular, a current direction through the Hall Sensors S1, S2, Sn is changed by 90° by means of the chopping circuits C1, C2, Cn.

Digital sensor values for each of the Hall sensor devices can be evaluated by the processing unit 70 to determine an offset value of the respective Hall sensor device. That offset value can be used to generate the offset control signal which is provided to the offset current circuit 50 which will provide an offset current additive to the sensing current of the transconductance amplifier 20. This makes it possible to compensate for offset effects in the Hall sensor devices and further offsets in the signal chain between the Hall sensor devices and the analog-to-digital converter 40.

The processing unit 70 is configured to evaluate the digital sensor values in order to detect, for example, a movement of a magnetic source with respect to the Hall sensor devices.

With reference to FIGS. 2A to 2D, four different processing states are shown, differing by the switching states of the switching elements 33, 34 and 35. One switching cycle of those four processing states is performed for each digital sensor value to be determined. Each of the FIGS. 2A to 2D shows a detail of the sensor arrangement including the transconductance amplifier 20, the filter stage 30, the analog-to-digital converter 40 and the offset current circuit 50.

Figure 2B:
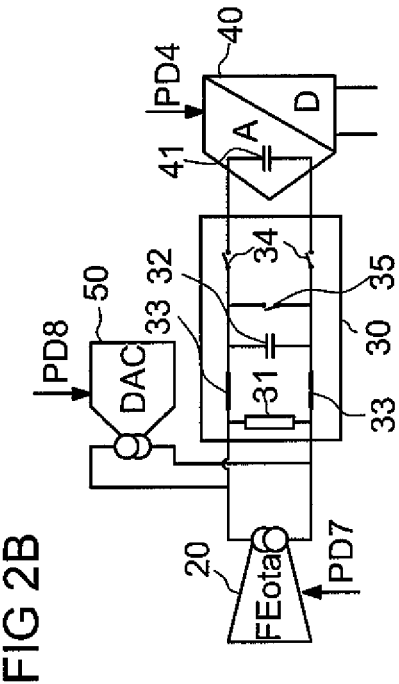
FIGS. 2A to 2D show various states in processing of sensor signals in a detail of the sensor arrangement of FIG. 1.
Figure 2D:
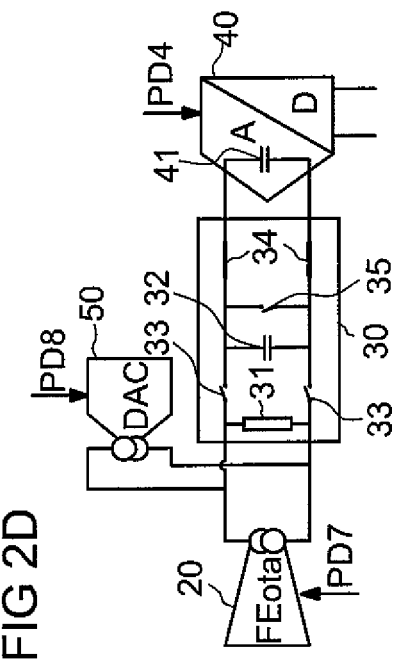
Figure 2A:
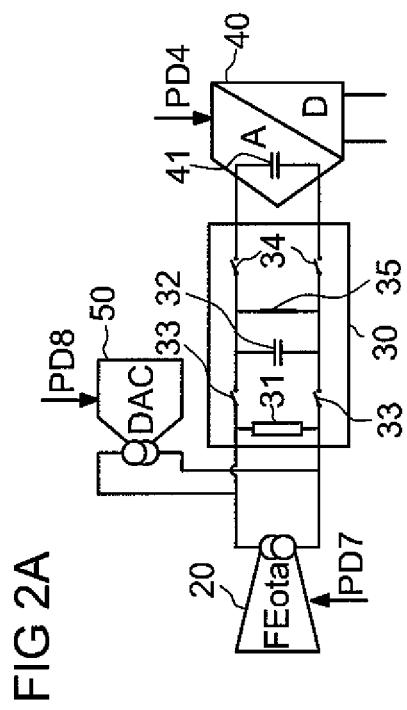

In the processing state of FIG. 2A, switching elements 33 and 34 are in an open state and switching element 35 is in a closed state. Hence, as during this time segment the filter capacitor 32 is short-circuited, filter capacitor 32 is fully discharged. This can ensure that a predefined initial state is guaranteed for all measurements. However, in order to save measurement time, the processing state of FIG. 2A can be omitted.

With reference to FIG. 2B, in a second processing state, switching elements 34 and 35 are in an open state whereas switching element 33 is in a closed state. Hence in this time segment, resistor 31 and filter capacitor 32 are connected in parallel, thus forming an RC low pass filter. The sensing current and the offset current react on that RC filter, resulting in a filtered voltage across the filter capacitor 32. A bandwidth of the RC low pass filter is determined by the respective values of the resistor 31 and the filter capacitor 32.

Figure 2C:
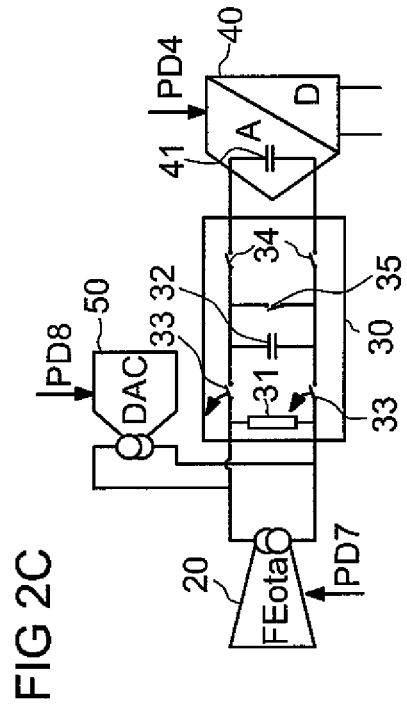

In a third processing state, shown in FIG. 2C, all switching elements 33, 34, 35 are in an open state. Thus, the third processing state is a sample-and-hold state ensuring that the output of the transconductance amplifier 20 and the offset current circuit 50, respectively, is not directly connected to the analog-to-digital converter 40. The sample-and-hold state can be short compared to the filtering state of FIG. 2B.

FIG. 2D shows a fourth processing state during which switching elements 33 and 35 are in an open state and switching element 34 is in a closed state. Hence, the filter capacitor 32 is connected in parallel to the input capacitor 41, thus making a charge transfer from the filter capacitor 32 to the input capacitor 41 possible. The fourth processing state can therefore also be called a charge transfer state. In said charge transfer state, the digital sensor value can be determined. After the determination, the next measurement can be started, beginning again with the first state or discharging state, alternatively the second or filtering state.

Looking at the different processing states, it can be seen that during the discharging state, neither operation of the transconductance amplifier 20 and the offset current circuit 50 nor the analog-to-digital converter 40 is needed. However, to avoid settling effects, the transconductance amplifier 20 and the offset current circuit 50 can be operated in view of the upcoming filtering state. Nevertheless, the analog-to-digital converter 40 can be switched off temporarily during the first and the second state which, for example, is controlled by a respective power-down signal PD4. In the third state or sample-and-hold state, after filtering is finished, operation of the transconductance amplifier 20 and the offset current circuit 50 is not needed temporarily. Thus, the circuits 20 and 50 can be switched off by respective power-down signals PD7, PD8, whereas the analog-to-digital converter 40 should be brought to an operating state by releasing the power-down signal PD4. With reference to FIG. 2D, circuits 20 and 50 can remain switched off during the charge transfer state while it is necessary to have the analog-to-digital converter 40 operable.

The switching off of the respective circuits can, for example, be performed by switching off a bias current supply to the circuits. Hence, although a supply voltage may be provided to the respective circuits, power consumption is reduced as a current flow which generates power loss is dependent on a bias current provided. Hence, the power efficiency of the sensor arrangement can be improved by temporarily powering down unused circuits.

It should be further noted that the power efficiency of the sensor arrangement could also be reduced by solely switching off the circuits 20, 50, and operating the analog-to-digital converter 40 continuously. However, it is preferable to have an analog-to-digital converter which can be operated on a short time basis.

As mentioned before, the analog-to-digital converter 40 uses reference voltages provided by the reference voltage circuit 42 for comparison purposes. To achieve accurate measurements, it is desirable to have accurate provision of the reference voltages guaranteed. For example, such voltages could be generated with a voltage control circuit employing a closed loop control. However, closed loop controls usually have a higher power consumption and need to be operated continuously to have the control loop settled. Therefore, in one embodiment of the sensor arrangement, an open loop circuit is used for the reference voltage generation.

Figure 3:
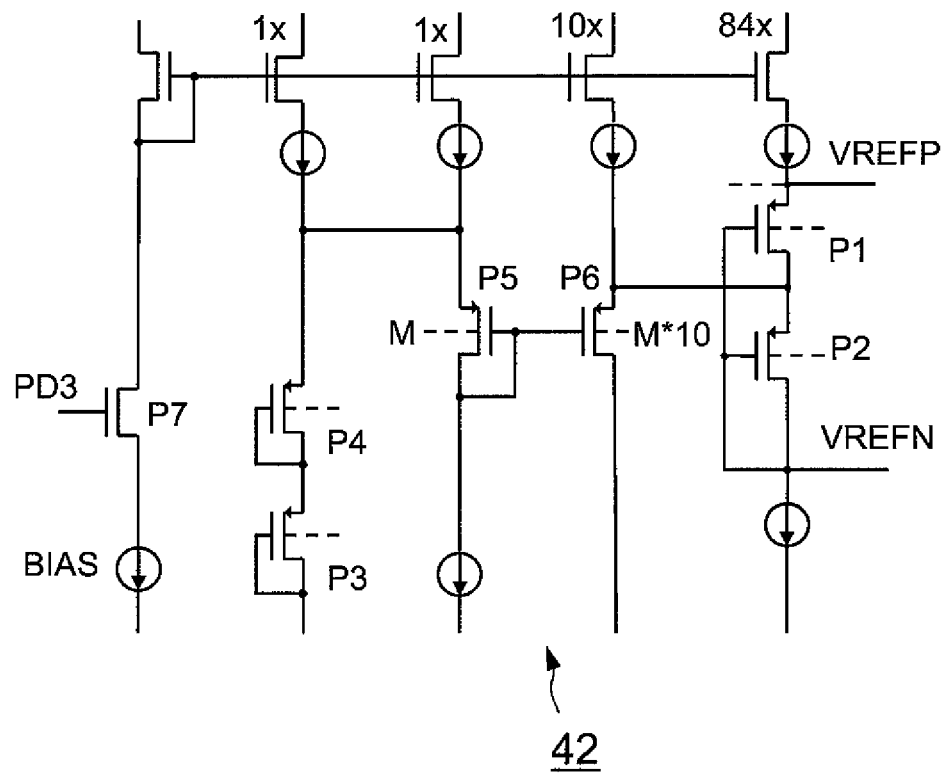
FIG. 3 shows an exemplary embodiment of a reference voltage circuit.

FIG. 3 shows an exemplary embodiment of a reference voltage circuit 42, comprising a pair of serially connected transistors P1, P2 which provide an upper or high reference voltage VREFP and a lower reference voltage VREFN. Circuit 42 further comprises serially connected transistors P3, P4 which generate a common mode voltage which is provided to a transistor P5. A further transistor P6 is connected to transistor P5 in a current mirror fashion, employing a scaling factor of 10. An output connection of transistor P6 is connected to a common connection of transistors P1, P2 to force the common mode voltage on the output branch. Each of the current paths is supplied by a current mirror transistor depending on a bias current, wherein the output branch is chosen to have a high quiescent current which is given by the factor 84, for example. The high quiescent current can ensure to have a fast startup and fast recovery time during possible switching activities of the analog-to-digital converter 40. The bias current can be a PIAT current in order to compensate for thermal effects of the resistance of the transistors P1, P2.

In processing states during which the analog-to-digital converter 40 is not operated, also the reference voltage circuit 42 can be switched off. This can, for example, be done by means of transistor P7, which is controlled by a further power-down signal PD3. If transistor P7 is controlled to an open state during power-down phases, no bias current will be mirrored to the remaining current paths. Hence, no or little power is lost during such phases.

In the embodiments described so far, reference voltages only need to be constant during one measurement cycle to achieve a complete set of digital sensor values. Furthermore, the settling behavior should be repeatable for one measurement cycle. The reference voltage circuit of FIG. 3 can be described by a low ohmic diode driven by a current source. Such a reference voltage source settles in a predictable and repeatable way due to the open loop nature of the circuit. Hence, a good accuracy can be achieved within one measurement cycle.

Figure 4:
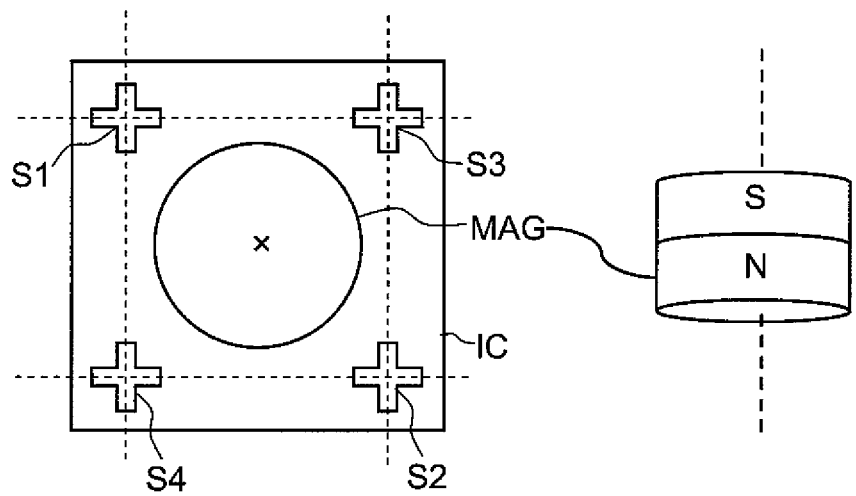
FIG. 4 shows an exemplary embodiment of a sensor arrangement with a magnetic source.

FIG. 4 shows a sensor arrangement which is integrated as an integrated circuit IC. The circuitry as shown in FIG. 1 is included within integrated circuit IC. However, for reasons of a better overview, the processing circuits are not shown in FIG. 4 but only the Hall sensors S1, S2, S3, S4 which are arranged symmetrically in the corners of a square. A magnetic source MAG is placed over the integrated circuit IC and over the Hall sensors S1 to S4, respectively. A 3-dimensional view of the magnetic source MAG is additionally shown on the right side of FIG. 4 for reasons of a better overview. The magnetic source MAG, for example, has a magnetic north pole N and a magnetic south pole S which generate a certain magnetic field intensity at the location of the Hall sensors. The polarity of the magnetic source MAG can be changed in various embodiments. If the magnetic source MAG is moved in any direction, the magnetic field intensity at the Hall sensors S1 to S4 changes. The respective movement of the magnetic force MAG can be evaluated by means of the digital sensor values provided by the corresponding evaluation.

With respect to FIGS. 1 and 2, one set of digital sensor values determined during one measurement cycle comprises four digital sensor values, namely one for each of the Hall sensors S1 to S4, if no chopping or current spinning is employed. In case chopping techniques are used to better deal with offset effects, the number of digital sensor values at least doubles such that one set comprises eight digital sensor values determined during one measurement cycle.

In another embodiment, a fifth Hall sensor could be placed in the center of the square shown in FIG. 4. A better accuracy can be achieved by further evaluating the magnetic field intensity at the center position. Additionally, a physical range of measurement, namely regarding the movement of the magnetic source MAG, can be increased by this measure. However, in the following, the exemplary embodiment with four Hall sensors as shown in FIG. 4 will be described. Hence, 5 or 10 digital sensor values are determined in one set, depending on the chopping operation.

Referring back to FIG. 1, it can be seen that also the mid-point control circuit 12 and the Hall bias current circuit 11 can be switched off temporarily by means of the power-down signal PD5. For example, circuits 11 and 12 could be switched off temporarily together with the transconductance amplifier 20 and the offset current circuit 50 during a charge transfer state.

A timing for the power-down signals PDi provided by the sequencer 110 is mainly determined by a first clock signal generated by the low-power oscillator 120 acting as a first oscillator circuit. The low-power oscillator 120 is always operating if the sensor arrangement is powered on. Accuracy and stability of the low-power oscillator can be neglected on a long-term basis as the control circuit 100 further comprises a high-power oscillator acting as a second oscillator circuit which generates a second clock signal having a higher clock frequency than the first clock signal. For example, the second clock signal is used to control a conversion process in the analog-to-digital converter 40. The high-power oscillator 130 has a higher accuracy than the low-power oscillator and is calibrated after powering up the sensor arrangement by means of calibration values stored in the non-volatile memory 150.

In order to improve the accuracy of the low-power oscillator 120, the first clock signal can be trimmed by the adaptive trim loop 140 which is driven by the second clock signal as a reference clock signal.

As it is usually sufficient to calibrate the high-power oscillator 130 once after powering up, circuit 150 can be powered down depending on a power-down signal PD0. Furthermore, also a central bias current generated by bias circuit 60 is only needed during a measurement cycle. Hence, bias circuit 60 can be powered down temporarily depending on the power-down signal PD6.

FIG. 5 shows a timing diagram of several power-down signals over the time range of one measurement cycle.

In the beginning, all power-down signals PD1, PD6, PD5, PD7, PD8, PD3, PD4, PD2 are high, or in other words, the respective circuits are powered down. Power-down signals PD1, PD6 controlling the high-power oscillator and the central bias current are the first signals to change to a low state, thus making a measurement cycle possible. After a certain time, during which both the second clock signal and the central bias current have been settled, the adaptive trim loop 140 is woken up by PD2 to trim the low-power oscillator 120. It is assumed that trimming of the low-power oscillator 120 is sufficient for one measurement cycle.

Regarding power-down signals PD5, PD7, PD8 and power-down signals PD3, PD4, time segments H1a, H1b, etc. denote a measurement for the first Hall sensor device H1 in a first chopping phase (a) and in a second chopping phase (b). Hence, during measurement H1a, first, power-down signals PD5, PD7, PD8 go to a low state thus activating mid-point control and Hall bias current as well as the transconductance amplifier 20 and the offset current generator 50. During said low state, the filtered voltage across filter capacitor 32 is generated depending on the sensor voltage provided by the first Hall sensor device H1. Second, power-down signals PD3, PD4 go to a low state such that the analog-to-digital converter 40 and the reference voltage circuit 42 are activated. Hence, during the low state of signals PD3, PD4, the first digital sensor value is determined. Furthermore, during that low state, mid-point control 12, Hall bias current circuit 11, transconductance amplifier 20 and said current circuit 50 are powered down temporarily, wherein these circuits are reactivated at the end of the analog-to-digital conversion for the second measurement H1b. A specific overlapping of the power-up phases is visible from the time diagram which takes into account settling requirements at the startup or reactivation of the respective circuits, respectively.

As can be seen from the diagram in FIG. 5, the measurement sequence is repeated for all eight measurements. After the eighth digital sensor value is determined, power-down signals PD3, PD4 go to a high state which makes it possible that also the high-power oscillator 130 and the central bias circuit 60 are switched off temporarily by means of the power-down signals PD1, PD6.

However, in order to save power, not only temporary switching off of the respective circuits during one measurement cycle can be performed but also a frequency of performing measurements cycles at all can be varied. For example, it may not be necessary to continuously determine the position of a magnetic source, taking the embodiment of FIG. 4 as an example. In other words, it may be sufficient to perform one measurement cycle from time to time.

FIG. 6 shows an exemplary timing diagram taking into account different measurement requirements. For example, one measurement cycle is triggered by a periodic wakeup signal shown in the upper half of the diagram of FIG. 6. If such wakeup signal trigger is received, the control circuit 100 or the sequencer 110 controls one measurement cycle which is shown in FIG. 6 by activating the high-power oscillator 130 and the central bias 60 by means of power-down signals PD1, PD6. The remaining power-down signals are not shown for reasons of a better overview but can easily be taken from the diagram shown in FIG. 5.

In the exemplary diagram of FIG. 6, the first measurement cycle is performed in a low-power mode of operation. However, in this example, no significant movement of a magnetic source is detected in the first measurement cycle by evaluating the set of digital sensor values. Thus, the sensor arrangement is held in the low-power mode of operation and woken up after a certain period which, for example, is 80 ms.

With the second wakeup trigger, the second measurement cycle is performed which in this case results in a detection of a movement of the magnetic source. For example, certain thresholds have been reached or crossed. As a consequence, the sensor arrangement is set to a high-power mode of operation during which the frequency of measurement cycles is increased. For example, a next measurement cycle is triggered after a shorter time interval, for example 20 ms. An evaluation of the set of digital sensor values still reveals exceeding of the given thresholds, thus high-power mode of operation is still maintained. The same applies for the fourth wakeup trigger.

At the fifth wakeup trigger, evaluation of the set of digital sensor values reveals that the magnetic source has returned to an initial position as the threshold values are not reached. As a consequence, the sensor arrangement is set back to a low-power mode of operation.

It should be noted that the timing diagrams are not drawn to scale. Therefore, the time between two wakeup pulses could be significantly longer than the time for one measurement cycle, both in the low-power mode of operation and the high-power mode of operation. Furthermore, even in the high-power mode of operation, the sensor arrangement is not operated continuously such that a good power efficiency of the sensor arrangement can also be achieved during the high-power mode of operation. However, if made necessary by a specific application, a continuous performing of measurement cycles could easily be done. Even in this case, the temporary powering down of certain circuits achieves a good power efficiency.

In further embodiments, also the low power oscillator 120 could be switched off during the low-power mode of operation, wherein switching on is to be controlled by a microcontroller in this case. For example, measurements can be performed on demand in control of said microcontroller. This can further reduce power consumption.

In the embodiments of the sensor arrangement described above, filtering of the raw sensor signal is done by using a simple RC filter, wherein the filter capacitor also acts as a sample-and-hold capacitance and instead of using an active signal buffer, the charge on the filter capacitor is used to transfer the signal to the input capacitance of the capacitive analog-to-digital converter. To get a well controlled and constant gain within one measurement cycle, namely for each of the Hall sensor devices, the filter capacitor is initially discharged before every single sample and the charging time is controlled with respect to the first clock signal generated by the low-power oscillator which is trimmed periodically to have a sufficient accuracy. During the charge transfer to the analog-to-digital converter and the later discharge phase, the next Hall sensor device or next chopping phase of the same Hall sensor device can already by connected to the transconductance amplifier. In other words, a pipelining approach is used which makes it possible to minimize the settling time requirements of the transconductance amplifier. The offset control signal provided to the offset current circuit will be switched with the selection of each Hall sensor device and will stay constant during the two chopping phases, if chopping is used.

Alternatively, a measurement cycle comprising measurements for every Hall sensor device in a chopping mode of operation can be done only every m'th on-cycle, for example every tenth on-cycle, and during the other on-cycles, the chopping will not be switched, or in other words, only one digital sensor value is determined for each of the Hall sensor devices. In this case, the calculated remaining offset will be updated and stored every m'th on-cycle and subtracted digitally during the other on-cycles. This is possible because the offset changes very slowly during operation.

Regarding the charging time, namely the time for charging the filter capacitor within the stage, this time can be varied for different modes of operation. For example, in a low-power mode of operation, the charging time can be lower than in the high-power mode of operation, for example in the order of one RC time constant. This has the effect that power consumption is further reduced but accuracy of the resulting digital sensor value is reduced, too. However, the accuracy is still sufficient to determine whether certain threshold values have been exceeded such that the sensor arrangement is switched to the high-power mode of operation. Hence, the following digital sensor values have sufficient accuracy to perform an exact evaluation. In high-power mode of operation, the charging time can be chosen in the order of 5 to 7 RC time constants.

In other words, in the low-power mode of operation, the sensor arrangement is operated with a degraded signal-to-noise ratio for the digital sensor values. In case a change of signal is detected, for example by means of the movement detection unit 90, the sensor arrangement is switched to a measurement with a better signal-to-noise ratio in the high-power mode of operation to decide whether the detection of a threshold crossing was caused by noise, being a fault detection, or a true change of signal. The degradation of the signal-to-noise ratio is preferably made by shortening the on-time of the measurement. However, also the whole bias current could be reduced to degrade the signal-to-noise ratio.

The total power consumption of the sensor arrangement depends on the relation of on-time times on-current to off-time times off-current. Thus, it is desirable to have an accurately controlled on/off time relation and a low power consumption during off time. The typical ratio of on-time to off-time could, for example, be 1:500. Oscillators with low power consumption usually run at relatively low frequencies, e.g. 30 kHz. In order to optimize the oscillator for lowest power, it is desirable to relax the frequency specification such that the frequency needs not to be absolutely stable over all operating conditions.

If a successive approximation analog-to-digital conversion is used, relatively high oscillator frequencies, e.g. 20 MHz, are used. In the embodiments of the sensor arrangement described above, a fast, accurate oscillator, namely the high-power oscillator, and a relatively inaccurate ring oscillator, namely the low-power oscillator, are used, for example. The low-power oscillator is adaptively trimmed by means of the second clock signal provided by the high-power and high-frequency oscillator. This trimming is performed during the on-time of the sensor arrangement and the trim information is stored in a static register. Using this method, the relation of on/off time can be maintained accurately, while a low power consumption is ensured during the off time.

Although the invention has been shown and described with respect to one or more implementations, equivalent alterations and modifications will occur to others skilled in the art based upon a reading and understanding of this specification and the annexed drawings. The invention includes all such modifications and alterations and is limited only by the scope of the following claims.

In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising." Also, the term "exemplary" is merely meant as an example, rather than the best or optimal. It is also to be appreciated that features and/or elements depicted herein are illustrated with particular dimensions relative to one another for purposes of simplicity and ease of understanding, and that actual dimensions may differ substantially from that illustrated herein.

We claim:
1. A sensor arrangement, comprising:
a plurality of Hall sensor devices each configured to provide a sensor voltage in response to a magnetic field intensity;
a selection unit configured to select a Hall sensor device from the plurality of Hall sensor devices and to forward a selected sensor voltage of the selected Hall sensor device;
a transconductance amplifier configured to generate a sensing current when the selection unit forwards the selected sensor voltage of the selected Hall sensor device, the sensing current depending on the forwarded selected sensor voltage;
a filter stage having a resistor and a filter capacitor connected in parallel in a switchable manner in response to a first switching signal, the filter stage being designed such that a filtered voltage forms across the filter capacitor depending on the sensing current;
a capacitive analog-to-digital converter having an input capacitor being connected to the filter capacitor in a switchable manner in response to a second switching signal, the analog-to-digital converter being configured to generate a digital sensor value based on the filtered voltage; and a control circuit configured to generate the first and the second switching signals such that for the selected sensor voltage being forwarded by the selection unit in a first time segment, the filtered voltage across the filter capacitor is formed, and in a second time segment, the input capacitor is connected to the filter capacitor.

2. The sensor arrangement of claim 1, wherein the analog-to-digital converter is a Nyquist-type analog-to-digital converter.

3. The sensor arrangement of claim 1, wherein the analog-to-digital converter is a successive approximation analog-to-digital converter.

4. The sensor arrangement of claim 1, wherein the analog-to-digital converter comprises a reference voltage circuit configured to provide a high reference voltage and a low reference voltage in an open-loop manner.

5. The sensor arrangement of claim 4, wherein the analog-to-digital converter and the reference voltage circuit are configured to be switched off temporarily in response to a power down signal which is generated by the control circuit.

6. The sensor arrangement of claim 1, further comprising an offset current circuit configured to generate an offset current in response to an offset control signal, the offset current being provided additive to the sensing current, wherein the filter stage is designed such that the filtered voltage forms across the filter capacitor, and wherein the filtered voltage is formed based on a combination of the sensing current and the offset current.

7. The sensor arrangement of claim 6, wherein the offset current circuit comprises a digital-to-analog converter which is provided with the offset control signal.

8. The sensor arrangement of claim 6, further comprising a processing unit being configured
to receive the digital sensor value;
to determine an offset value based on the digital sensor value received; and
to generate the offset control signal based on the offset value.

9. The sensor arrangement of claim 8, wherein the processing unit comprises a digital signal processor.

10. The sensor arrangement of claim 6, wherein the offset current circuit is configured to be switched off temporarily in response to a power down signal which is generated by the control circuit.

11. The sensor arrangement of claim 1, wherein the transconductance amplifier is configured to be switched off temporarily in response to a power down signal which is generated by the control circuit.

12. The sensor arrangement of claim 1, wherein the filter stage is designed such that, when the selection unit forwards the selected sensor voltage of the selected Hall sensor device, the filter capacitor discharges in a third time segment before the first time segment in response to a third switching signal which is generated by the control circuit.

13. The sensor arrangement of claim 1, further comprising
a Hall bias current circuit configured to provide a Hall bias current to the selected Hall sensor device; and
a midpoint control circuit configured to provide a midpoint control signal to the selected Hall sensor device.

14. The sensor arrangement of claim 13, wherein the Hall bias current circuit and the midpoint control circuit are configured to be switched off temporarily in response to a power down signal which is generated by the control circuit.

15. The sensor arrangement of claim 1, wherein the Hall sensor devices are configured to be operated in a chopping mode of operation in response to a chopping control signal which is generated by the control circuit.

16. The sensor arrangement of claim 1, further comprising:
a first oscillator circuit configured to generate a first clock signal which is provided to the control circuit as a basis for generating the first and the second switching signals; and
a second oscillator circuit configured to generate a second clock signal having a higher clock frequency than the first clock signal, the second clock signal being provided to the analog-to-digital converter;
wherein the second oscillator circuit has a higher power consumption than the first oscillator circuit and is configured to be switched off temporarily in response to a power down signal, which is generated by the control circuit.

17. The sensor arrangement of claim 16, wherein the first oscillator circuit is configured to be trimmed by means of the second clock signal.

18. A method for operating a sensor arrangement having a plurality of Hall sensor devices being responsive to a magnetic field intensity, the method comprising:
selecting a Hall sensor device from the plurality of Hall sensor devices;
controlling the selected Hall sensor device to generate a sensor voltage;
forwarding the generated sensor voltage to a transconductance amplifier;
generating a sensing current depending on the forwarded sensor voltage by means of the transconductance amplifier;
connecting in parallel, during a first time segment for the forwarded sensor voltage, a resistor and a filter capacitor;
charging, during the first time segment, the filter capacitor with the generated sensing current and generating a filtered voltage across the filter capacitor;
disconnecting, at the end of the first time segment, the resistor and the filter capacitor;
connecting, during a second time segment for the forwarded sensor voltage, the filter capacitor to an input capacitor of a capacitive analog-to-digital converter; and
generating, during the second time segment, a digital sensor value based on the filtered voltage by means of the analog-to-digital converter.

19. The method of claim 18, wherein the digital sensor value is generated using a successive approximation method.

20. The method of claim 18, wherein a high reference voltage and a low reference voltage are generated for the analog-to-digital converter in an open-loop manner.

21. The method of claim 18, wherein the analog-to-digital converter is switched off temporarily during a time segment being a beginning part of the first time segment.

22. The method of claim 18, further comprising:
generating an offset current for the generated sensing current in response to an offset control signal;
providing the offset current additive to the generated sensing current for charging the filter capacitor; and
generating the filtered voltage across the filter capacitor depending on a combination of the offset current and the generated sensing current.

23. The method of claim 22, wherein the generating the offset current is stopped temporarily during a time interval during which the filter capacitor is connected to the input capacitor of the analog-to-digital converter, wherein the time interval is a portion of said second time segment.

24. The method of claim 18, wherein the transconductance amplifier is switched off temporarily during a time interval during which the filter capacitor is connected to the input capacitor of the analog-to-digital converter, wherein the time interval is a portion of said second time segment.

25. The method of claim 18, wherein the filter capacitor is discharged in a third time segment before the first time segment.

26. The method of claim 18, wherein the Hall sensor devices are operated in a chopping mode of operation.

* * * * *